Figure 3:
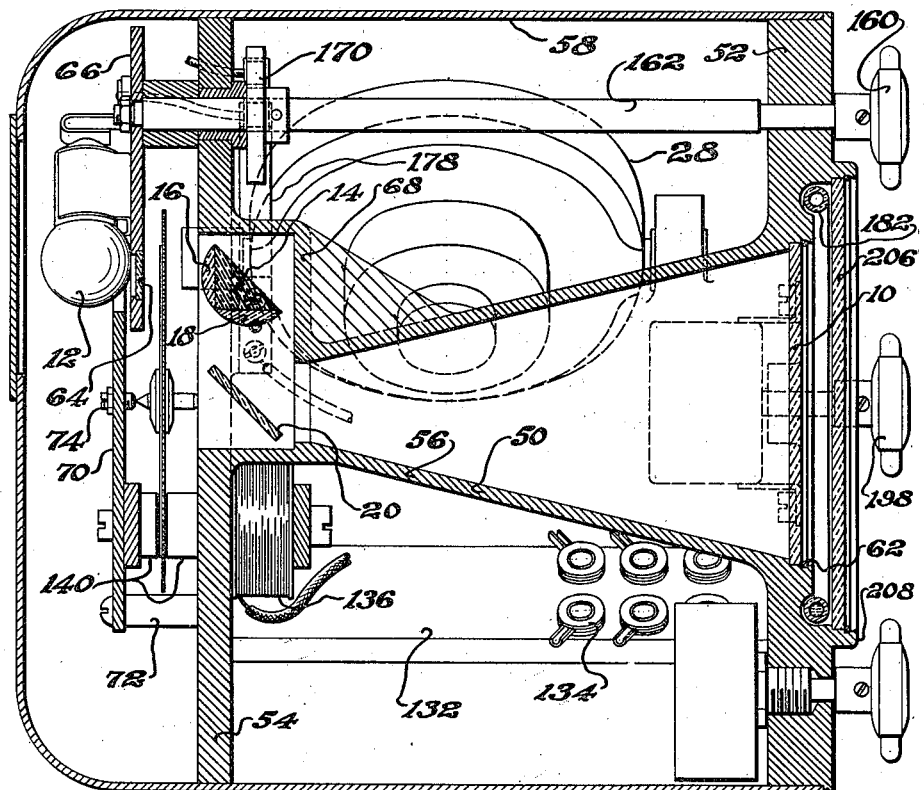

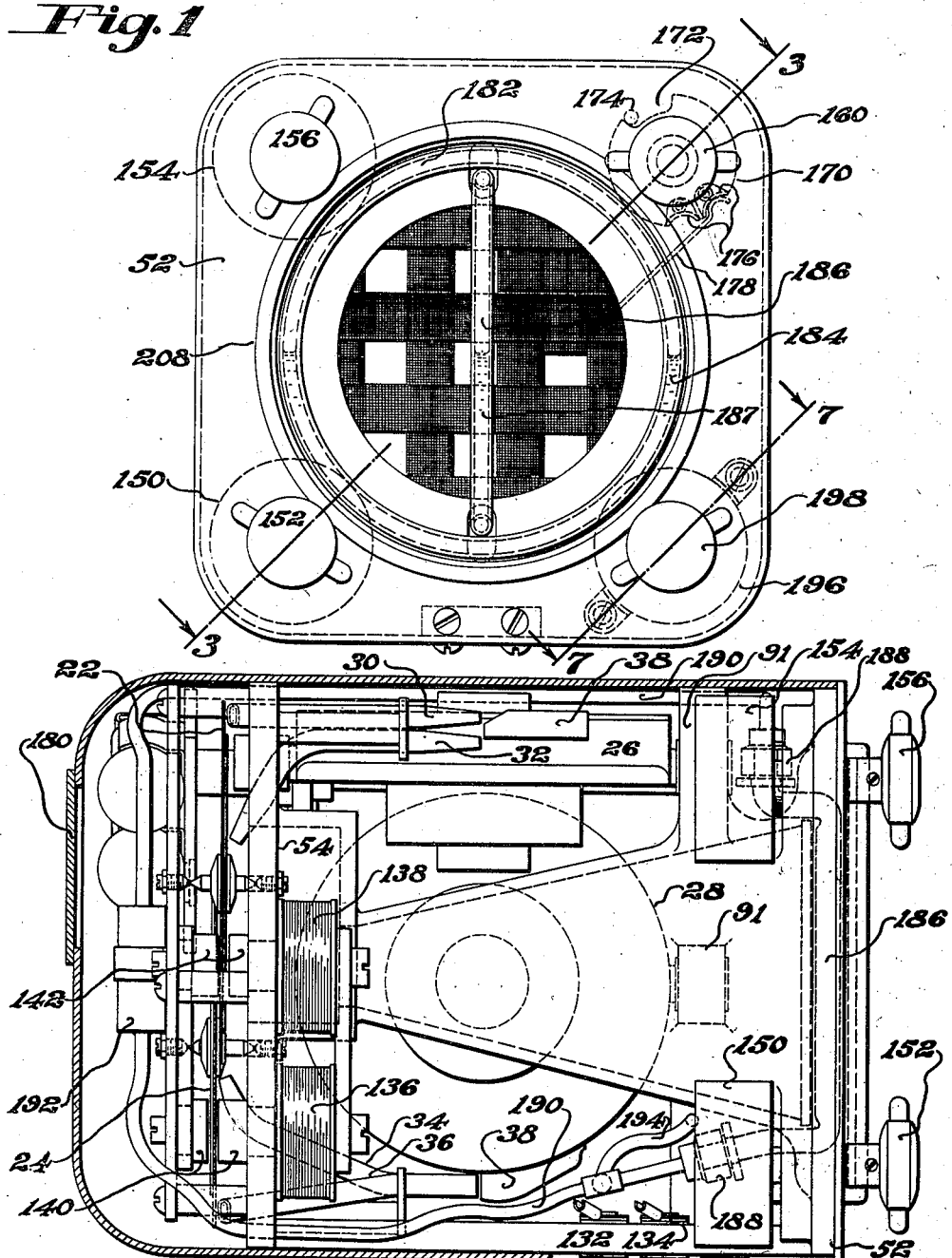

Jan. 5, 1943. T. W. KENYON 2,307,590
MEANS FOR INDICATING TURNING MOVEMENTS OF A CRAFT
Filed July 23, 1934 5 Sheets-Sheet 2

Jan. 5, 1943.   T. W. KENYON   2,307,590
MEANS FOR INDICATING TURNING MOVEMENTS OF A CRAFT
Filed July 23, 1934   5 Sheets-Sheet 3
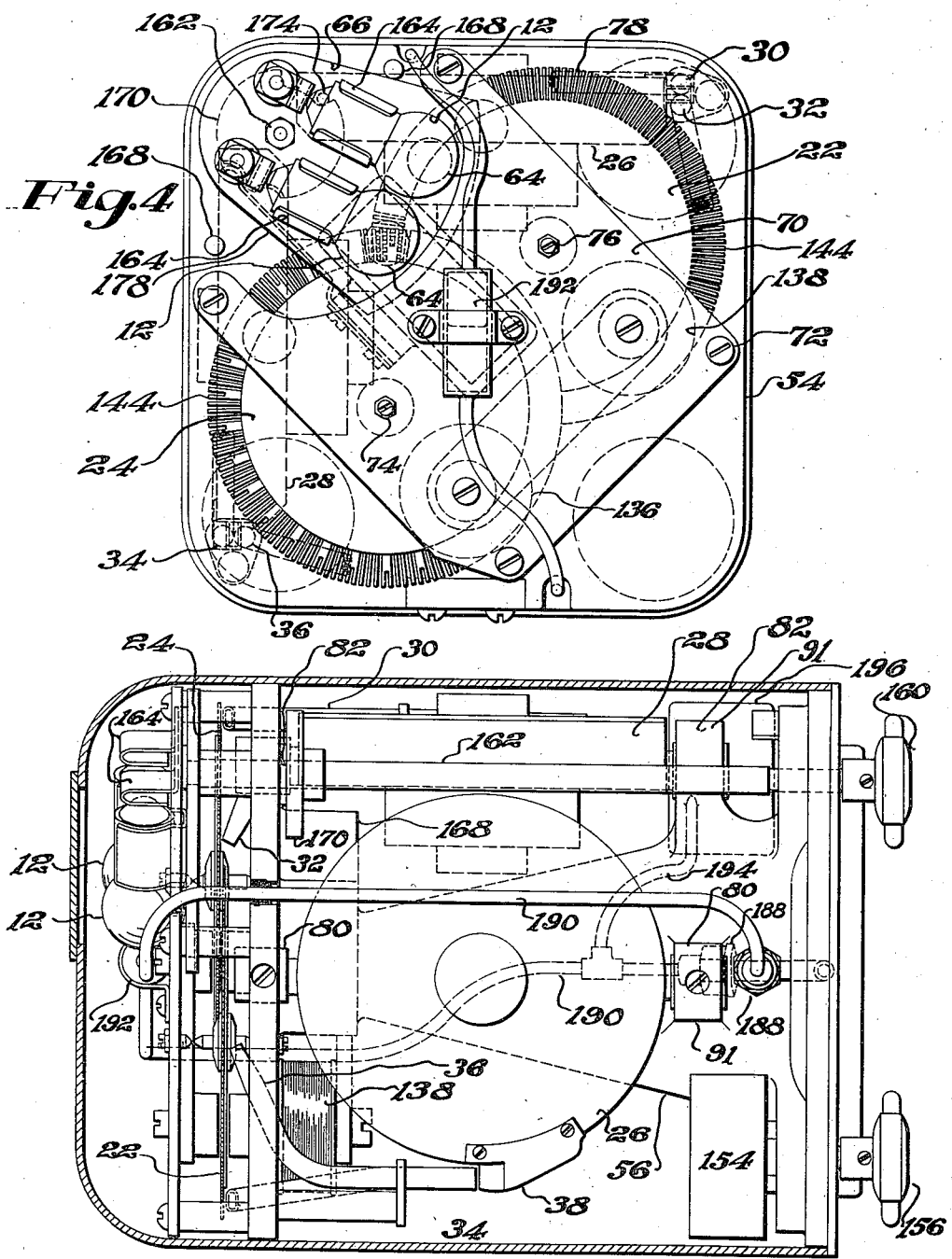

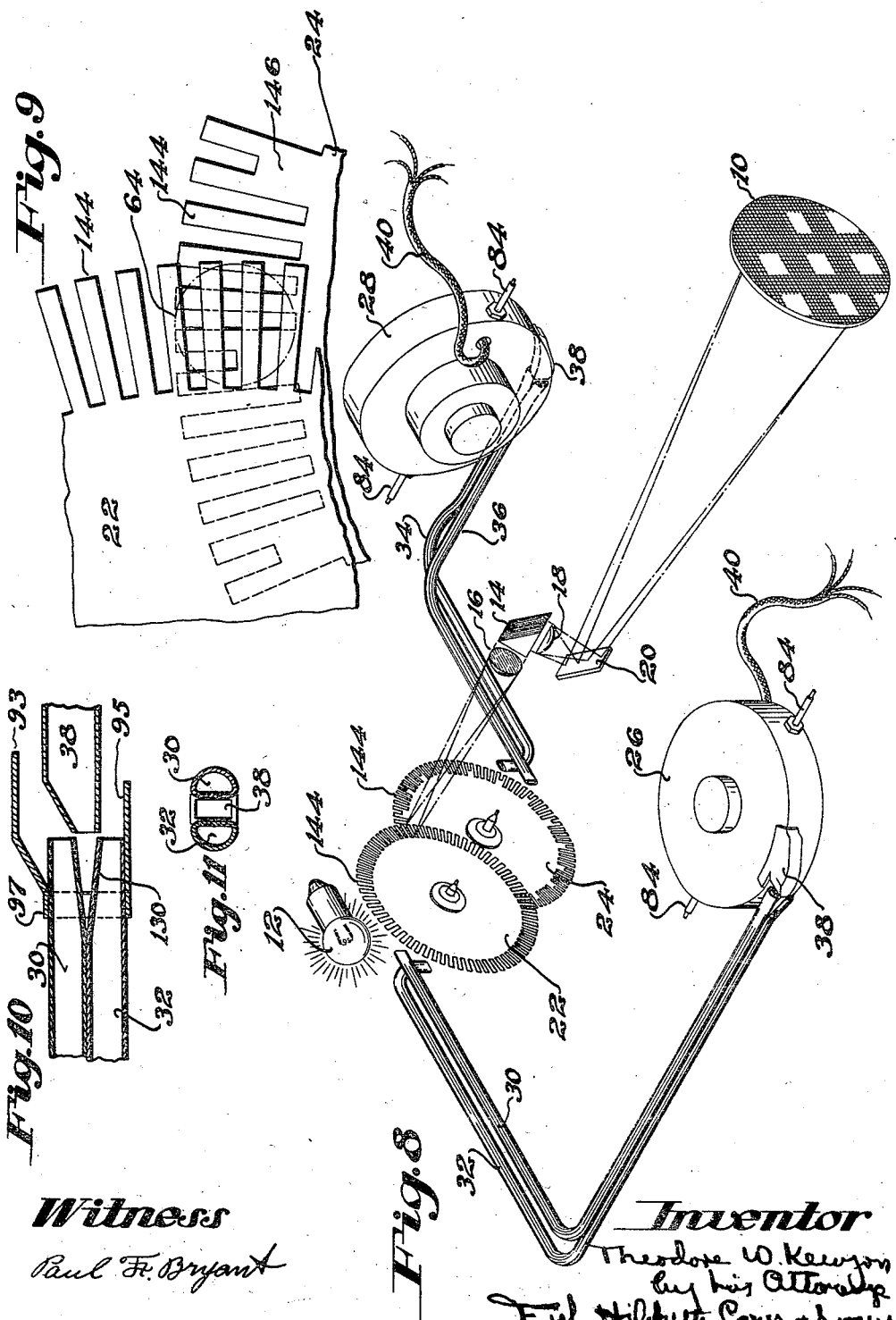

Jan. 5, 1943.  T. W. KENYON  2,307,590
MEANS FOR INDICATING TURNING MOVEMENTS OF A CRAFT
Filed July 23, 1934  5 Sheets-Sheet 5
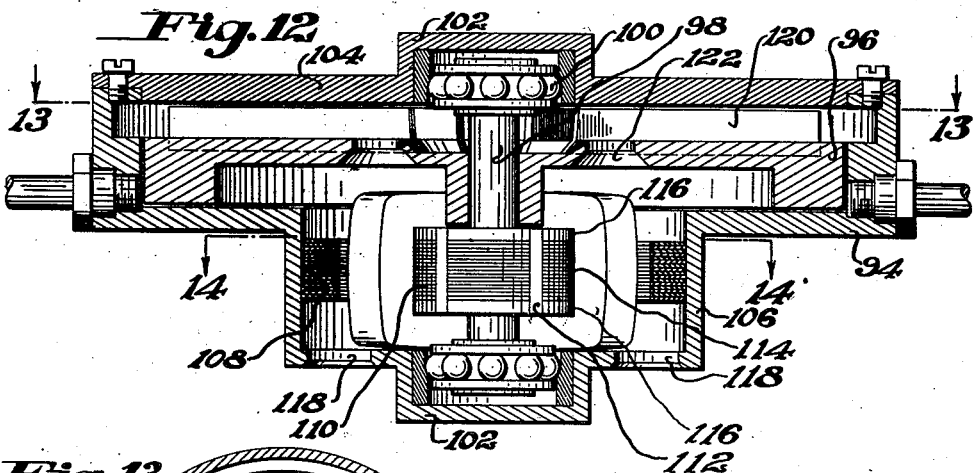
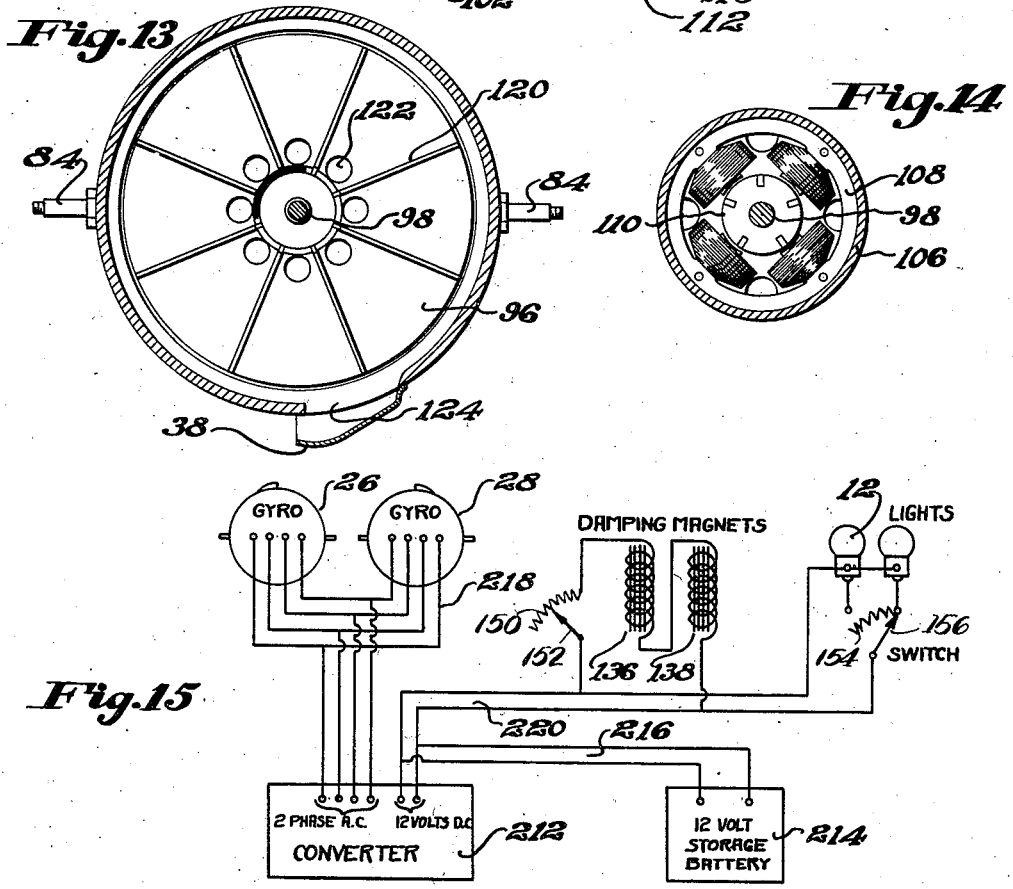

Patented Jan. 5, 1943

2,307,590

UNITED STATES PATENT OFFICE 2,307,590

MEANS FOR INDICATING TURNING MOVEMENTS OF A CRAFT

Theodore W. Kenyon, Newton, Mass., assignor, by mesne assignments, to Sperry Gyroscope Company, Inc., Brooklyn, N. Y., a corporation of New York Application July 23, 1934, Serial No. 736,566

40 Claims. (Cl. 33—204)

The present invention relates to a means for indicating deviation or turning movement of a craft from its normal or straight-away course. The invention is particularly applicable to aircraft, and when employed for this purpose denotes deviation of the craft from its normal course in either of two planes normal to one another.

The purpose and object of the invention is to provide a relatively simple and infallible method and instrument by virtue of which the pilot of an aircraft can at all times maintain complete control of the ship independently of whether or not fixed objects from without the craft may be visible. In the parlance of the aircraft pilot, the instrument is intended to aid and facilitate "blind flying."

With this and similar objects in view, the invention contemplates the production at the face of the instrument of indicating means which is normally stationary until turning movement occurs. Thereupon the indicating means is instantly animated to visually indicate to the pilot the occurrence of a change or deviation from the course. The animation of the indicator conveniently takes the form of a movement across the face comparable and opposite to the turning movement. If the turning movement is confined to a single plane, the animated indicator will move either across the screen or vertically up and down the screen, depending upon the plane in which movement occurs. If the turning movement is in the form of a bank or a spiral or any similar maneuver, the movement of the indicator represents a composite of the movement in the two planes, and affords accurate indication to the operator of what may be necessary to correct the deviation. As this movement is comparable in its rate to the rate of turn, the pilot is enabled to determine by watching the movement of the indicator the approximate extent to which the turning movement has changed the course of the ship and generally locate his position thereby.

In the form of the invention disclosed in this application, the indicator is preferably in the form of an image which is projected upon an illuminated screen by the employment of an interrupted surface or surfaces, such as teeth or cross bars located in the path of light which illuminates the screen to form alternate light and dark zones, such as a checkered pattern. The interrupted surface hereinafter referred to as a toothed disk is controlled by but is unconnected with a gyroscopic unit which in the normal course of flight does not actuate the surface, but upon a deviation from this course of flight causes instant actuation of the surface at a rate dependent upon the rate of deviation. This rate constitutes a measurement of the force which the gyro creates in attempting to maintain its normal axis of rotation, and the distance moved is hence a measure of the amount of course deviation.

In applying the present invention to the use of aircraft two relatively movable surfaces are employed, each independently controlled by a separate gyro unit rotating in planes normal to one another. Each interrupted surface is in the form of a peripheral toothed disk which is rotated in either direction through an air jet controlled by the gyro unit. In the normal plane of rotation of the gyro the disks remain stationary. If the gyro tends to move in either direction from this plane of rotation, the appropriate air jet is caused to rotate its accompanying disk at a speed governed by the force of the jet. This movement of either disk continues until the gyro has resumed its normal plane of rotation upon restoration of the ship to its course. Movements of the gyro with respect to the instrument are confined to small limits, thus compelling the gyro to promptly assume a new axis of rotation without hunting whenever the ship ceases a turning movement and inaugurates a new course.

Each gyro unit is provided with a self-contained motor element directly connected to the rotor and operating the latter at a high rate of speed. These motor units are suitably connected with a source of power from without the instrument. In driving the gyro units in this manner the external connections are confined to electrical leads, and no piping or similar appurtenances are required. Air under pressure for the operation of the toothed disks is independently furnished to each system by fan blades mounted upon the side of the gyro rotor communicating with an air delivery in the periphery. Angular movements of the gyro unit as a whole serve to place this air delivery in partial or complete register with the adjacent ends of two conductor pipes communicating with air jets which impel each disk in opposite directions.

A limited portion of the teeth on each disk also serve as crossbar indicators, the movement of each across the face of the instrument giving the appearance of a picket fence from a train window. By locating the two disks so that the observed portions of the teeth intersect substantially at right angles, I also provide a series of checkered squares on the illuminated screen. By utilizing periodically modified teeth, the extent of turning movement is visually indicated on the screen. For example, if every fifth tooth upon the disk which responds to turning movements in a horizontal plane is foreshortened, a modification of the checkered squares upon the screen occurs. As the rate of movement of the image across the screen corresponds to the rate of turn, the pilot can readily gauge the amount of the turning movement by a count of the number of interrupted squares which pass before him.

In all cases where blind flying is required due to lack of visibility, this ability to determine the extent of any turning movement is important. This is particularly true in approaching a landing field, where the general position of the craft with respect to the field may be located by a two-way radio. Appropriate directions from the field coupled with the indication of position afforded by the image, affords the pilot sufficient information to in all probability make a successful landing, even in those cases where there is a total lack of visibility.

Figures 6, 7:
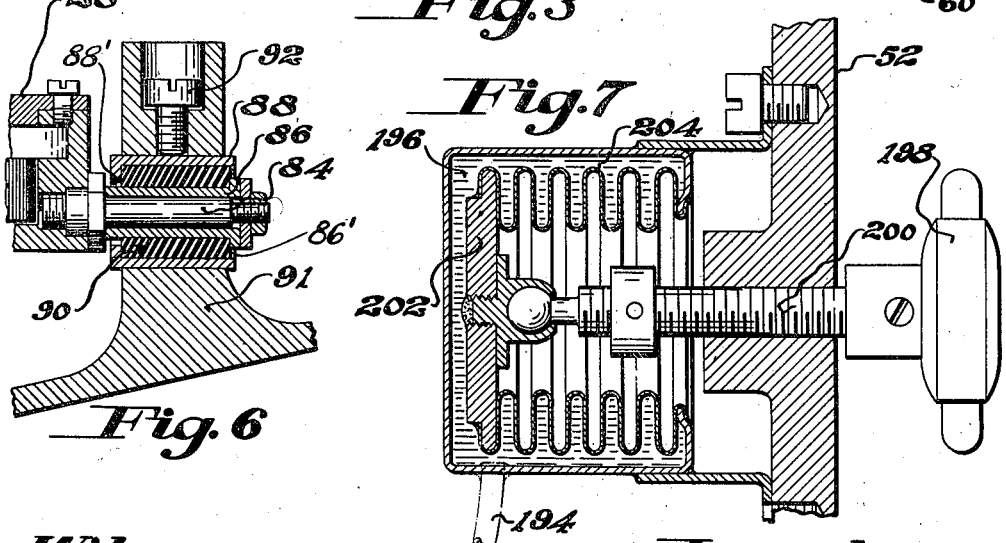

In the accompanying drawings illustrating the preferred form of the invention, Fig. 1 is a front elevation of the instrument employed; Fig. 2 is a side elevation of the instrument shown in Fig. 1 with the casing cut away; Fig. 3 is a longitudinal section on the line 3—3 of Fig. 1; Fig. 4 is a rear elevation with the casing removed; Fig. 5 is a plan view with the casing cut away; Fig. 6 is a detail illustrating the means for resisting movement of precession of the gyro; Fig. 7 is a detail showing a section on the line 7—7 of Fig. 1 for compensating a liquid level system; Fig. 8 is a diagrammatic view of the system as a whole; Fig. 9 is an enlarged detail illustrating the interrupting teeth in the region of intersection; Figs. 10 and 11 are details illustrating the arrangement of the blower jet on the gyro housing with relation to the companion intakes; Fig. 12 is a longitudinal section of the gyro unit; Fig. 13 is a section of the unit upon the line 13—13 of Fig. 12, taken upon a smaller scale; Fig. 14 is a section upon the line 14—14 of Fig. 12 illustrating the operating motor; and Fig. 15 is a diagrammatic showing of the electrical circuit for operating the gyro motors.

Upon reference to Fig. 8, the nature of the system and its mode of operation may be readily understood. A visible screen 10, which may be made of translucent or pellucid material such as ground glass, is mounted in a position in the face of the instrument where it may easily be read. This screen is illuminated from a bulb 12 which is arranged to project a beam of light condensed and directed on to the screen through an optical or light-diversion system consisting of a prism 14 and lenses 16 and 18 located in the light path at opposite sides of the prism. The beam of light as deflected by the prism is again deflected by a mirror 20 on to the screen. This beam of light is interrupted by movable indicators, e. g., revolving disks 22 and 24, provided with interrupted surfaces such as toothed peripheries which intersect in the light path and cast an image upon the screen. When the disks are stationary the pattern created upon the screen is stationary and generally in the form of checkered squares. When either or both of the disks rotates the pattern is caused to move across the screen in a direction and at a speed depending upon the rotation of the disks. For example, rotation of one disk causes movement of the pattern in a generally horizontal direction, whereas movement of the companion disk causes a movement of the pattern at right angles in a vertical direction. Movement of both disks will cause a composite movement of the pattern. The rotation of the disks and the consequent movement of the pattern is maintained within limits to permit actual visual observation of the image at all times. In other words, the pilot may actually see the intersecting teeth as they pass by one another, and not the effect created by these teeth moving at high speed.

The rotation of the disks is individually controlled by two gyro units 26 and 28 mounted for rotation in planes normal to one another, one of the gyro units indicating deviation of the craft in a vertical plane, and the companion gyro indicating deviation of the craft in a horizontal plane. Deviation in any given plane creates a tendency of the gyro unit to precess in a direction opposite to the deviation, and this tendency to precess and the slight movement allowed the unit thereby is utilized to impel or drive the companion disk. Each of the disks is driven in either one of two directions by pressure lines 30 and 32, and 34 and 36. The lines 30 and 32 control the disk 22 from the gyro unit 26 and are individually supplied with air under pressure from an outlet fitting 38 provided on the gyro housing. A constant supply of air under pressure is directed from the outlet during the operation of the gyro, and swiveling movements of precession of the gyro in either direction bring this outlet into partial or complete registry with the appropriate air intake, causing a like rotation of the disk 22. Each of the gyros is driven by a self-contained motor unit energized through a connection 40.

So long as the ship maintains its normal course, the gyros rotate about an axis which maintains the air outlet in a neutral position. Upon deviation of a ship from this course, the slight movement of precession of the gyro brings the air outlet into partial registry with the appropriate pressure pipe, and if the deviation becomes more abrupt, the impelling force causes movement of the unit into complete registration with a consequent increase in speed of the driven disk. This movement of one or both disks continues so long as deviation is occurring and at a speed dependent upon the rate of deviation. Resumption of a normal course of flight causes immediate restoration of the gyro units to a neutral position, and the movement of the disks ceases with resulting stabilization of the image. With this method of operation the pilot has presented constantly before him a normally stationary image which is instantly animated upon deviation or turning movement from either one of two planes normal to each other.

Referring more particularly to the structural aspects of the instrument itself, it will be observed from an inspection of Fig. 3 that the instrument comprises generally a support 50 comprising a front plate 52 and a back plate 54 connected by a funnel-shaped member 56. This support may be in the form of a casting of aluminum alloy or similar light metal, properly finished to provide accurate relationship of the parts. The front plate of the support is intended to be mounted directly upon the instrument board, and the various parts of the instrument are supported thereby. The assembly is completely enclosed by a cup-shaped housing or shell 58, which fits over the back plate and engages at its front edge with a shoulder 60 formed at the periphery of the front plate.

The ground glass forming the screen 10 is mounted at the enlarged end of the funnel 56 in the path of the light source and retained in place by a detent ring 62. At the opposite or smaller end of the funnel-shaped passage is mounted the reflecting mirror 20 at an appropriate angle to deflect the beam of light centrally upon the screen. This light beam is projected upon the mirror from the optical prism 14, which has the lenses 16 and 18 conveniently secured to opposite faces. The source of light 12 directs its beam through a transparent window 64 mounted in a supporting plate 66.

The optical prism with attached lenses is conveniently supported at one side of the funnel axis through an enlargement 68 formed in the support as indicated. The interrupted disks which intersect the path of light are both supported for rotation in bearings mounted respectively in the back plate 64 and a supplementary plate 70 supported therefrom in spaced relation by standards 72 at the four corners thereof. This plate, as indicated more particularly in Fig. 4, is positioned at an angle to the plate 54 and the disk bearings are indicated at 74 and 76.

The disks 22 and 24 are of exceedingly light construction with inconsiderable inertia, and are provided with uniform and regularly arranged teeth 78 which intersect in the path of light. The gyro unit 26 controlling the disk 22 is mounted for rotation in a horizontal plane, and the gyro unit 28 controlling the disk 24 is mounted for rotation in a vertical plane, all as shown clearly in Fig. 4. Turning movement of the craft in a vertical plane tends to cause precession of the gyro 26, whereas turning movement in a horizontal plane tends to cause precession of the gyro unit 28 with accompanying rotation of the controlled disks through the pressure lines communicating therewith.

It will be noted that each of the gyro units is swiveled for movements of precession in bearings 80 provided for the unit 26, and bearings 82 provided for the unit 28. The forward member of each of these sets of bearings is provided by a projection 91 extending from the sides of the funnel-shaped casting 56, and the aft bearings are mounted directly in the back plate 54. The detail of one of the forward bearings is indicated in Fig. 6, and illustrates a short shaft or trunnion 84 extending from the gyro housing and surrounded by a sleeve 86 having an end flange 86'. This sleeve revolves within a sleeve housing 88 having an opposite end flange 88', and inserted between the two sleeves is a rubber tension member 90, bound to the sleeves either by mechanical force or vulcanization, and tending to resist rotative and axial movements of the shaft 88 in either direction. The rubber cushion not only shock mounts the gyroscopic in all planes but ideally serves the purpose of a spring load to resist movements of precession of the gyro unit, and constantly tends to restore the unit upon movement in either direction to a neutral position. The force necessary to overcome the resistance of the restoring cushion or spring is created by the turning movement of the craft. The unit is locked in place within the projection 91 from the funnel casting by a screw 92. Each of the swivel bearings for supporting the gyro units is provided with this type of resistance member. The tendency of the gyro units to precess is intended to be limited to angles of 5° or less by stop members 93 and 95 positioned as shown more particularly in Fig. 10 at opposite sides of the delivery jet 38. These stop members are mounted upon a band 97 supported upon the air pipes 30 and 32. These stop members confine movements of the jet to a position in full registry with either of the intake pipes, and accordingly limit the movements of precession of the operating gyro. They are primarily intended to prevent excessive movement upon abrupt turns of the craft.

Ordinarily the load imposed by the restoring member 90 in sufficient to maintain the gyro unit against excessive motion. However, abrupt turning movements of the craft may cause the exertion of a force sufficient to require the positive limiting stop.

As indicated more particularly in Figs. 12 to 14, each gyro unit comprises a circular housing portion 94 within which is journaled the gyro rotor 96. The rotor is mounted upon a shaft 98 supported at opposite ends by ball bearings 100, which are received in bearing cap portions 102 formed respectively on the housing and a cover plate 104. As will be evident from Fig. 12, the housing 94 is provided with a reduced portion 106, somewhat larger than the cap portion 102, within which are supported motor laminations 108. The shaft 98 is provided in the same region with an armature 110, mounted directly thereon and serving to drive the rotor at the necessary high rate of speed. The small driving motor is preferably a two-phase induction type of motor employing neither commutator nor slip rings, and operated by less than 12 volts. The armature, as indicated, is provided with five copper bars 112 and steel laminations 114 engaged between copper plates 116. The outer wall of the housing portion 106 is provided with air intake openings 118, through which air is drawn by the operation of the rotor. Mounted upon the face of the rotor 96 remote from the armature are a series of impelling blades 120, which tend to draw air through a series of openings 122 provided in the rotor adjacent the hub. The circulation induced by the fan blades rotating at high speed creates a cooling draft about the driving motor. This high speed fan is caused to deliver air peripherally through the tangential outlet 124, which terminates in the nozzle 38, as shown particularly in Fig. 8. This nozzle, as indicated in Fig. 11, is rectangular in cross-section, and in the neutral position of the gyro unit the air blast delivered therefrom is disposed between the intake openings of the companion air pipes. These pipes, as again indicated in Figs. 10 and 11, are tapered at 130 to provide a neutral space therebetween, are of approximately the same width as the delivery jet 38, and are designed to be brought either into partial or complete register with the delivery jet upon precession of the gyro unit in either direction.

It will be noted that with this construction, movement of the jet 38 from neutral position causes partial register with either intake opening, but in no event can even there be communication between the delivery jet and both intake openings at the same time. With this construction an impelling air current of varying intensity is delivered to either of the air pipes connecting each unit, and as precession continues and the registry of the delivery jet and intake opening becomes more complete, the intensity increases together with a corresponding increase in speed of the disk. Actually the rate of speed of the disk in either case affords a very good measurement of the force with which the gyro tends to precess, inasmuch as this movement of precession is resisted by a spring load. As the force with which the gyro tends to precess is a function of the rate of turn, it follows that the speed of the disk accordingly affords an accurate measurement of the rate of turn.

Each gyro unit is provided with suitable electrical connections (not shown for purposes of simplicity), which serve to energize the motor. These connections lead to a terminal block or bar 132 of insulating material, provided with a series of terminal connections 134 for both the driving of the gyro units, illuminating the screen, and energizing the damping devices. The terminal block is shown in Fig. 3, but the actual connections are omitted for the purpose of simplicity.

The light running disks 22 and 24 are immediately energized and caused to rotate upon a slight movement of the gyro unit, bringing the outlet jet 38 into initial operating position with respect to the appropriate air pipe. This rotation continues until the return of the gyro unit to neutral position by the restoring springs 90. Thereafter movement is immediately terminated by damping devices in the form of electro-magnets provided for each disk. As indicated more particularly in Figs. 2 to 5, coils 136 and 138 are mounted upon the back plate 54 opposite the face of each of the disks. The armatures are indicated at 140 and 142, having two parts in proximity to the face of each disk for damping its motion as the latter sweeps between the parts and cuts the lines of force. Although this type of damping effect does not prevent an instantaneous response of the disks to the action of the air jet, it does terminate motion of the disks upon cessation of the jet, and avoids any sporadic or occasional movement of the disks due to jarring or vibration when not intended to operate. The prevention of over-running of the disks and the prompt and instantaneous cessation of movement upon restoration of normal flight is an important adjunct of the instrument. In fact, without damping means operative upon the disks, the regular movement thereof could not be made accurately proportional to the amount of turn, because the rate of turn of the disks can only be made proportional to the force of the air jets exerted thereon if the rotation of the disks is opposed by a uniform force or drag. It is also essential that means be provided (as hereinafter described) to adjust this opposing force or drag in order to properly calibrate the instrument.

Each of the disks, as indicated, is provided with uniformly arranged teeth 144, which intersect in the path of the light beam to provide an image in the general form of checkered squares, as shown generally in Fig. 1. These teeth also serve as impelling members to rotate the disks through the air jets delivered from the pipes 30 and 32 in one case, and 34 and 36 in the other case. As the rate of rotation of the disks affords a measurement of the rate of turn of the craft, it follows that the extent and duration of this rotation also affords a measure of the extent to which the craft has changed its course at any given time. For the purpose of making this measurement readily available to the pilot, the disk 24, which is intended to indicate turning movements of the craft in a generally horizontal plane, is provided with foreshortened or interrupted teeth at regular intervals to cause an interruption of the image or a darkening of the squares, as indicated in the upper right-hand corner of the screen in Fig. 1. For small deviations the indicator readily shows the extent of turn. For larger deviations, by watching the movement of the image and counting the number of such interruptions which pass across the screen, the pilot can readily estimate the extent to which the craft has been turned from its original course at any given instant. The value of this feature is well exemplified in landing when visibility is obscured. If the pilot knows from communication with the field that he is over either end of the field, it is therefore necessary for him to know whether in turning he has accomplished a 90° or 180° turn. By observing the image and coordinating the number of interruptions which traverse the screen, he can readily estimate the extent to which the turning movement has altered the original direction of the craft. Obviously the number of interruptions corresponding to any given angle of turn would depend on the adjustment of the instrument and the number of toothed spaces at which interruptions occur. With the number of interruptions which correspond to any given angle once determined, however, the instrument functions to provide a sufficiently accurate measure of the turning movement. The manner in which the teeth 144 intersect, together with the character of the foreshortened teeth 146, is clearly illustrated in Fig. 9 of the drawings, the region of intersection of the teeth determining the image which is thrown upon the screen 10, as shown in Figs. 1 and 8.

The instrument is provided with several adjustments which are intended to facilitate its operation and usefulness. For example, referring to Figs. 1 and 2, an adjustable rheostat 150 is located in the lower left-hand corner of the housing, with provision for adjustment through a knob 152 extending without the housing. This rheostat is connected with the damping magnet circuit, and is intended to alter and modify the damping effect. This rheostat plays an important part in calibrating the instrument, as hereinbefore referred to. By adjusting this rheostat, the angle through which the disk turns for any given turn of the craft may be varied within wide limits. Preferably the rheostat is so adjusted that the disk 24 will make one complete revolution during a complete 360° turn of the craft, so that on the dial the space between like points on two adjacent points represents two degrees and the space between two shortened teeth represents ten degrees. During a procedure turn of the craft, i. e., at a rate of 180° a minute, the teeth would pass across the face at the same slow rate. An adjustable rheostat 154 mounted in the upper left-hand corner of the housing controlled by an external knob 156, is suitably connected with the light 12 to alter its intensity and accordingly the brilliance of illumination of the screen. In operating the instrument in a bright light, the screen requires more illumination than is the case at night or with a poor light. In addition, provision is made for shifting the lights in the event of failure. To this end, located in the upper right-hand corner of the housing, as shown in Fig. 1, is a knob 160 connected with the front end of a shaft 162 all as shown in Fig. 3, which passes through the back plate 54 at its upper portion. This shaft carries on its outer end the mounting plate or sector 66, upon which the lamp 12 and window 64 are supported. Referring more particularly to Fig. 4, it will be noted that this mounting plate or sector is capable of rocking about the shaft axis, and carries two terminal clips 164, within each of which is clipped a bulb 12. The sector also is provided with two windows 64 aligned with the bulbs. The location of the sector in either one of two positions is determined in part by stop pins 168, and in part by a detent ring 170 mounted upon the shaft adjacent the back plate, as shown in Figs. 3 and 1. This detent ring, as shown more particularly in Fig. 1, is provided with a cut-away portion 172 at the rim within which plays a pin 174 projecting from the back plate. The ring is also provided at its opposite side with two scalloped contact portions 176 engaged by a detent spring contact 178. The arrangement is intended to locate the lamp-carrying sector in either one of two operating positions in which one lamp and its associated window is accurately aligned with the region of tooth intersection. With this construction, failure of either light permits instant substitution of a new light by simple manipulation of the knob 160. Access to the lights for replacement may be readily had through a detachable cover plate 180 mounted upon the rear of the housing opposite the lights. It will be noted from an inspection of Fig. 4 that the supporting member 70 attached to the back plate is cut away at its upper end to permit swinging movements of the sector therein.

In addition to indication of turning movement, the instrument is also provided with indicators for determining the inclination of the craft, both athwart the ship and fore and aft of the ship. The indication of inclination athwart the ship is afforded by a ring indicator 182 formed from a transparent tube containing a viscous liquid 184 observable by the operator. This tube provides a complete circle, and is inset in the front plate 52 around the circular screen opening. Inclination of the craft, as in the case of a 45° bank, is readily shown by this type of indicator. Inclination of the craft in a fore and aft direction is indicated by an indicator 186 in the form of a transparent tube containing viscous liquid 187. Whereas the tube 182 forms a closed circle located in a plane athwart the craft, the indicator 186 is connected with a closed system lying in a plane extending fore and aft of the craft. This is shown more particularly in Fig. 2, which shows the visible portion 186 of the indicator connected at its opposite upper and lower ends through couplings 188 with a closed system of piping 190 extending rearwardly to the lower part of the instrument, and thence upwardly and longitudinally of the upper portion of the instrument to the upper coupling 188. The rear portion of the system is provided with an enlarged reservoir or chamber 192, and this system is also connected to a compensating device through a pipe 194 shown in Fig. 5. This pipe 194 places the system in communication with a compensating chamber 196 of adjustable capacity. Adjustment of the capacity of the compensating chamber, as shown particularly in Fig. 7, may be made by the operator through a knob 198 extending from the lower right-hand corner of the instrument, and connected through a shaft 200 with the inner free end 202 of a bellows unit 204, which upon movement in or out of the shaft serves to displace liquid in the compensating chamber and vary the level indication at 186. The purpose of this adjustment is to enable the operator to adjust his level indication at 186 to a definite neutral position in the event that the ship tends to fly with either end downward. Ordinarily the inclined position of the ship when travelling in a horizontal plane would be reflected by an indication at 186. With proper adjustment, however, this initial inclination may be compensated for and the instrument caused to reflect only movements of climb or descent, or in other words, confined to its actual function.

This type of instrument may be located in the instrument board of an aeroplane, or in any convenient position with respect to any craft in predetermined relation to the fore and aft axis of the craft, the longitudinal plane of the instrument, as shown in Fig. 2, coinciding substantially with this axis, and the face of the instrument, as shown in Fig. 1, lying athwart the axis. In this position, so long as the craft pursues a normal or straight-away course, the image projected upon the illuminated screen is stationary. The instant a turning movement in any direction is initiated, however, the image becomes animated and indicates by its direction and rate both the direction and rate of turn. The movement of the image, as explained heretofore, is opposite to the direction of turn, making the act of the pilot to correct the turn wholly instinctive, as the effect is measurably the same as that created by observing the ground or a fixed object. Instantly upon cessation of the turn, the image becomes stabilized due to the highly damped disks, and the return of the gyro units; the units are confined to small movements and are immediately compelled to seek a new axis of rotation upon inception of a new straight-away course. The animated image accurately typifying the turning movements of the craft, coupled with the two indicators to show inclination and pitch of the craft, afford the operator or pilot all needed information to insure complete control of the craft at all times.

An inspection of Fig. 3 will indicate that the fluid indicators are enclosed by a transparent window 206 clamped in a ring projection 208 formed on the front plate 52. This window not only covers and protects the indicators, but also the ground glass screen.

The induction motors for driving the gyro rotors are conveniently operated from a motor generator unit which receives its energy from a 12-volt storage battery 214 normally carried as part of the equipment of a plane. The motor generator is not indicated in detail, but shown generally at 212 in Fig. 15. It is located either upon or adjacent to the battery and comprises a direct current motor with a directly connected two-phase generator, which in turn is connected to the instrument and the gyro motors through electrical leads. The diagram for the motor lighting and damping circuits is indicated in Fig. 15.

As indicated more particularly therein, a suitable storage battery 214 is connected by a circuit 216 with the rotary converter 212. This converter operates at 12 volts D. C., and generates 2-phase A. C. The 2-phase generator is electrically connected with the motor of each of the gyros 26 and 28 by the circuits indicated generally at 218. The illuminating bulbs 12 and the damping magnets 136 and 138 receive their energy from a circuit 220 carrying direct current at 12 volts from the storage battery, the controlling rheostats being shown at 150 and 154.

It will be evident to those skilled in the art that the instrument when applied to air craft may be mounted on the usual instrument board, with the longitudinal plane of the instrument, which may be the plane shown in Fig. 3, coincident with the longitudinal axis of the craft. This locates the controlling gyros in the proper position to accomplish their desired function.

What is claimed is:

1. An instrument of the class described comprising a gyroscopic unit, means for confining the unit to movements of small angularity, a rotary toothed disk, air lines venting at the periphery of the disk to impel the latter and having intakes in proximity to the gyroscopic unit, means forming a part of the gyroscopic unit and movable therewith for creating an air current for the rotation of the disk, and means for delivering the air current in a relationship to the air intakes determined by the position of the unit, the teeth on said disc being visible at the face of the instrument and giving an indication of the precessional displacement of said gyroscope.

2. An instrument of the class described comprising a casing, a gyro rotor mounted within the casing, bearings for swivelling movement of the casing, and rubber tension members incorporated with the bearings to yieldingly resist swivelling movements of the casing in either direction.

3. An instrument of the class described comprising a support having fore and aft portions connected by a hollow cone, a visible screen mounted at the enlarged portion of the cone, a light diversion system mounted upon the support adjacent the small end of the cone, a toothed disk journaled for rotation upon the support, a source of light casting upon the screen a beam intercepted by the toothed disk, a damping magnet in proximity to the disk, a gyro unit located between the fore and aft portions of the support at one side of the cone, and means controlled by precession of the gyro unit as the craft moves angularly for rotating the disk.

4. An instrument of the class described comprising toothed disks rotating about spaced and parallel axes so disposed that the peripheries of the disks intersect approximately at right angles, an illuminated screen, means for projecting an image of the disk teeth in the region of intersection upon the screen, gyroscopic units, and means controlled by the precession of each gyroscopic unit to cause rotation of a respective disk in either direction upon like movements of precession of the gyro.

5. An instrument of the class described for aircraft, comprising a screen, a source of light for illuminating the screen, toothed disks intersecting at their peripheries in the path of light, means for directing the path of light on the screen to cast an image thereon, two gyro units, one mounted for precession upon turning of the craft about one axis, and the other mounted for precession upon turning of the craft about an axis normal thereto, means for limiting movements of precession of the gyro units, reversible motive means for impelling each disk in opposite directions, and means governed by the respective gyro units for controlling said means in accordance with the direction and extent of movements of precession of the gyros.

6. An instrument of the class described comprising front and back plates with an intermediate connecting cone, a pellucid screen closing the front and large end of the cone, a light diversion system located at the opposite and small end of the cone, duplicate sources of illumination for the screen, and means without the instrument for moving either source of illumination into operative relation with the light diversion system.

7. An instrument of the class described comprising overlapping toothed disks, means for mounting the disks for rotation in close proximity to one another, independent gyro units mounted for two degrees of freedom, means for confining each unit to small movements of precession, sources of pressure for independently impelling each disk, and means for independently controlling the sources of pressure from a respective gyro unit by movements of precession thereof.

8. An instrument of the class described comprising independent gyro units mounted for rotation in planes normal to one another and for precession about parallel axes, means for limiting movements of precession of each unit, light running and overlapping disks, sources of air pressure for impelling each disk, means governed by each gyro for controlling a respective source of air pressure, a rotation dampener for each disk, and a common support for the gyros and disks to preserve the predefined relationship thereof.

9. An instrument of the class described having a face visible to the operator, two sets of cross bars movable substantially at right angles to one another across said face and forming a checkered pattern, gyroscopic units mounted for limited movements of precession, and means controlled by precession of the gyros for causing a continuous sweep of the checkered image across the face so long as precession of either gyro continues due to angular movement of the craft.

10. A directional indicator for aircraft showing deviation from course, comprising a constrained gyroscope mounted for precession through an angle proportional to the rate of turn of the craft, an air turbine, air flow means adapted to drive the same in either direction at variable rates, means controlled by the precession of said gyroscope governing said flow means to drive said turbine at a rate proportional to the extent of and in a direction governed by the direction of the precession thereof, and an indicator actuated by said turbine.

11. An attitude and course indicator for aircraft comprising a pair of constrained gyroscopes mounted for precession, respectively, upon turning and upon tipping of the craft, a pair of motors controlled each by the precession of a gyroscope, and a pair of conjointly readable superimposed indicators driven by said motors, each mounted to move in the plane of movement of the craft which actuates the same.

12. An instrument of the class described, comprising a support having fore and aft portions connected by a hollow cone, a visible screen mounted at the enlarged portion of the cone, a light diversion system mounted upon the support adjacent the small end of the cone, a toothed disc journaled for rotation upon the support, a source of light casting upon the screen a beam intercepted by the toothed disc, a gyro unit located between the fore and aft portions of the support at one side of the cone, and means controlled by precession of the gyro unit as the craft moves angularly for rotating the disc.

13. An instrument of the class described, comprising a gyro unit of the turn indicator type having means for yieldingly opposing precessional movements thereof from its normal position, a cross bar device mounted independently of the gyro unit, and means controlled by the position of said unit for continuously impelling said device across the face of the instrument during precession of said unit in a direction corresponding to the direction of precession and at a speed substantially proportional to the extent of precession.

14. A flight indicator for aircraft comprising two sets of cross bars movable vertically and horizontally across the face of said indicator, a pair of turn indicator type gyroscopes, and means controlled by the precession of each gyroscope to cause movement of the respective set of bars in either direction according to the direction of precession of the respective gyroscope.

15. A flight indicator for aircraft comprising two sets of cross bars movable vertically and horizontally across the face thereof, a pair of turn indicator type gyroscopes, one mounted for precession upon turning of the craft in azimuth and the other for precession upon pitching of the craft, means controlled by the precession of the first gyroscope to cause continuous lateral movement of one set of bars in one direction or the other, depending on the direction and rate of turn, and means controlled by the precession of the other gyroscope to cause continuous up or down movement of the other set of bars, depending on the direction and rate of pitch.

16. The combination with a turn indicator type gyroscope mounted on a craft for precession about an axis on turning of the craft, resilient centralizing means acting about the precession axis whereby the extent of precession is proportional to the rate of turn of the craft, means for converting the rate of turn precession thereof into course deviation indications, comprising an air jet moved by and upon precession of said gyroscope, a pair of receiving ports adjacent thereto to differentially receive the air from said jet upon precession of said gyroscope, a reversible air motor connected to said ports, an indicator driven thereby, a drag means for opposing motion of said indicator, the extent of movement of said indicator being indicative of the course deviation.

17. In a flight instrument for aircraft the combination of means for indicating a turn of the craft, an air driven turbine for actuating said indicating means, and means responsive to rate of turn for regulating the air drive of the turbine to actuate said indicating means, whereby the latter indicates the rate of turn integrated with respect to time.

18. In a flight instrument for aircraft the combination of means for indicating a turn of the craft, a turbine for operating said indicating means, a air jet means for driving the turbine, and gyroscopically controlled means responsive to rate of turn for regulating the air jet drive of the turbine.

19. An aircraft flight instrument comprising a turn indicating member, an air driven turbine operatively connected to the member for actuating the member, means for pneumatically driving the turbine, gyroscopically controlled means responsive to rate of turn for regulating the pneumatic drive according to the right and left turn of the supporting aircraft, and means magnetically damping the turbine, whereby to actuate the turn indicator for designating degree of turn.

20. In a flight instrument for aircraft the combination of means for indicating a turn of the craft, an air driven turbine for actuating said indicating means, means responsive to rate of turn for regulating the air drive of the turbine to actuate said indicating means, and means for placing a brake or drag on said turbine which increases with speed, whereby the indicating means indicates the rate of turn integrated with respect to time.

21. In a flight instrument for aircraft the combination of means for indicating a turn of the craft, a turbine for operating said indicating means, air jet means for driving the turbine, gyroscopically controlled means responsive to rate of turn for regulating the air jet drive of the turbine, and a magnetic drag or eddy current brake operating to oppose motion of said turbine, whereby said indicating means is turned an amount indicative of the amount of course change.

22. An angular rate gyroscope comprising a rotor and rotor bearing element and a supporting element in which said bearing element is journaled for precession, the journals between said elements comprising trunnions fixed to one element and resilient means interiorly secured around said trunnions and exteriorly to said other element to cushion the gyroscope in all planes and to resiliently oppose precession.

23. An angular rate gyroscope comprising a rotor and rotor bearing element and a supporting element in which said bearing element is journaled for precession, the journals between said elements comprising trunnions fixed to one element, spaced bearing member secured in the other element, and a rubber element between each trunnion and bearing member secured to each, whereby precession of the gyroscope is yieldingly opposed by said rubber and said gyroscope is shock mounted.

24. An angular rate gyroscope comprising a rotor and rotor bearing element and a supporting element in which said bearing element is journaled for precession, the journals between said elements comprising trunnions fixed to one element, a bearing member for each trunnion secured in the other element and spaced from its trunnion, collars on said trunnion and member, and a rubber element between said trunnion and bearing member secured to each, whereby precession of the gyroscope is yieldingly opposed by said rubber and said gyroscope is shock mounted in all planes.

25. A directional indicator for aircraft comprising a constrained gyroscope mounted for precession through an angle proportional to the rate of turn of the craft, an indicator movable about an axis, means controlled by the precessional position of said gyroscope for applying a turning force to said indicator in a direction and of a strength governed by and proportional to the direction and extent of precession of said gyroscope, and a drag device acting on said indicator opposing motion thereof in proportion to its speed, whereby said indicator is turned an amount proportional to course change.

26. A directional indicator for aircraft comprising a constrained gyroscope mounted for precession through an angle proportional to the rate of turn of the craft, a rotatable indicator, means controlled by the precessional position of said gyroscope for applying a turning force to said indicator in a direction and of a strength governed by and proportional to the direction and extent of precession of said gyroscope, a drag device acting on said indicator opposing motion thereof in proportion to its speed, and means for adjusting the strength of said drag, whereby the amount of turn of said indicator may be made equal to the amount of course deviation.

27. An instrument of the class described comprising a visible surface, a source of light, an optical system for directing the source of light upon the visible surface to illuminate the same, a member having an interrupted surface positioned in the path of light from the source and designed to create an interrupted pattern of light upon the surface, a gyroscopic unit, means for driving the unit, and means controlled by and upon precession of said unit for continuously revolving the member upon an angular change in attitude of the instrument.

28. An instrument of the class described comprising a visible surface, a source of light, an optical system for directing the source of light upon the visible surface to illuminate the same, a member having an interrupted surface positioned in the path of light from the source and designed to create an interrupted pattern of light upon the surface, a gyroscopic unit, means for driving the unit, means controlled by precession of said unit for continuously revolving the member upon precession of the unit from its normal plane of rotation due to a change in position of the instrument, and means for arresting movement of the member upon restoration of the gyroscopic unit to its normal plane.

29. An instrument of the class described comprising a visible surface, means for illuminating the surface, a gyroscopic unit, means for confining the unit to small movements of precession, a toothed disc positioned in the path of illumination, and means for rotating the disc controlled by movements of precession of the gyroscopic unit.

30. An instrument of the class described comprising an illuminated screen, a toothed disc, means for projecting an image of a group of disc teeth upon the screen, a gyroscopic unit, air jets for reversely operating the disc, and controlling means operated by opposite directions of precession of the gyroscopic unit for governing the operation of the respective air jets.

31. An aircraft instrument of the class described comprising two gyroscopic units, one mounted for precession upon turning of the craft about one axis and the other mounted for precession upon turning of the craft about an axis normal thereto, yielding means for opposing precession of each unit, overlapping indicator members having interrupted surfaces, means for causing the surfaces in the overlapping region to produce an image visible to the operator, means for impelling each of the members in a direction normal to the other member at the overlapping portions thereof, and a source of impelling power for each of the surfaces controlled independently by precession of a respective gyroscopic unit.

32. An instrument of the class described comprising a face or sight opening, an indicator in the form of alternate light and dark zones visible in the sight opening, a gyroscopic unit mounted for precession, oppositely acting fluid ports differentially activated by precessional movements of said unit, and fluid operated means controlled by the said ports for continuously moving said zones across the sight opening so long as precession of the unit continues and at a rate of speed controlled by the amount of precession.

33. An instrument of the class described comprising a surface visible to the operator, a source of light for illuminating the surface, a barred surface interposed in the path of the light source to create a normally stationary barred image upon the visible surface, a normally centralized gyroscope, and motive means controlled by precession of the gyroscope away from its centralized position for continuously moving said barred surface so long as said gyroscope remains decentralized on account of a turning movement of the craft to impart a continuous animation to the image during duration of turning movement.

34. An instrument of the class described comprising a visible surface, a light source for illuminating the surface, a gyroscope unit, means located in the path of the light from said source for projecting an image upon the visible surface, and means controlled by the gyroscopic unit for moving the first means to continuously animate the image during precession of the gyroscopic unit and at a variable rate governed by the force exerted through precession of the unit.

35. An instrument of the class described comprising an indicator in the form of alternate light and opaque parallel bars visible to the operator and normally stationary, a gyroscopic unit mounted to precess on turning movement of the instrument in a plane, a reversing controller operated thereby in a direction and amount corresponding proportional to the direction and extent of precession, and power driven means controlled by precession of said controller for continuously moving said indicator, so long as precession continues, at a speed proportional to the extent of precession and in a direction opposite to the direction of turning movement.

36. An instrument of the class described comprising a gyroscopic unit confined for movement of precession in a plane, an indicator in the form of alternate light and opaque parallel bars visible to the operator, a fluid operated motor for moving the indicator, and air ports differentially controlled by precession of the gyroscopic unit for continuously operating the motor, during precession, in one or the other direction and at a variable rate determined by the direction and amount of precession.

37. A course and attitude indicator for aircraft having a face or sight opening, an overlapping pattern of two series of cross bars at said face, two gyroscopic units mounted for precession respectively upon turning of the craft about a respective one of two mutually normal axes, means for confining the movement of said series of bars to paths at right angles to one another across said face, means controlled by each gyroscopic unit when the craft changes its direction of movement for actuating a respective one of said series of bars independently according as said aircraft changes its attitude about one or the other of said two normal axes, the movement of said bars continuing so long as precession of the unit persists, and both series of bars being superimposed.

38. An instrument of the class described for aircraft, comprising a surface visible to the operator, a source of light for illuminating the surface, a member interposed in the path of light in a manner to produce a pattern or image upon the visible surface, power means for moving said member, and gyroscopically controlled means for causing said power means to continuously move the member during turning of the instrument in a plane and in a direction opposite to the turn of the aircraft to impart a like movement to the image on the visible surface.

39. An aircraft instrument of the class described, comprising gyroscopic units mounted for precession in planes normal to one another upon turning of the craft in azimuth and elevation, means for spinning the rotors of said units, superimposed indications visible to the operator to form a coalescent image, means controlled by precession of one of said units for continuously moving one image in a path visualizing the turn of the plane in azimuth, and means controlled by precession of the other gyroscopic unit for continuously moving the other image up or down, whereby when the plane is turning both in azimuth and elevation said image appears to move in the same direction that the horizon appears to move under like conditions.

40. An attitude indicator for aircraft comprising a pair of superimposed cross bar members giving a generally checkered pattern visible to the operator, gyroscopically controlled means for moving a respective one of said members in one path upon turning of the craft in azimuth and for moving the other of said members in a path at right angles to the first mentioned path upon turning of the craft in elevation, whereby when the craft turns in elevation while turning in azimuth, the pattern appears to move in the same plane that the horizon appears to move under such conditions.

THEODORE W. KENYON.